(12) United States Patent
Colombo et al.

(10) Patent No.: US 12,208,810 B2
(45) Date of Patent: Jan. 28, 2025

(54) METHOD FOR ESTIMATING THE PRESSURE OF THE TYRES OF A VEHICLE

(71) Applicants: MASERATI S.P.A., Modena (IT);
POLITECNICO DI MILANO, Milan (IT)

(72) Inventors: Tommaso Colombo, Fidenza (IT);
Simone Formentin, Busto Arsizio (IT);
Alessandro Pozzato, Piossasco (IT);
Sergio Matteo Savaresi, Cremona (IT)

(73) Assignees: MASERATI S.P.A., Modena (IT);
POLITECNICO DI MILANO, Milan (IT)

( * ) Notice: Subject to any disclaimer, the term of this patent is extended or adjusted under 35 U.S.C. 154(b) by 463 days.

(21) Appl. No.: 17/416,144

(22) PCT Filed: Dec. 19, 2019

(86) PCT No.: PCT/IB2019/061079
§ 371 (c)(1),
(2) Date: Jun. 18, 2021

(87) PCT Pub. No.: WO2020/128938
PCT Pub. Date: Jun. 25, 2020

(65) Prior Publication Data
US 2022/0055634 A1 Feb. 24, 2022

(30) Foreign Application Priority Data
Dec. 19, 2018 (IT) .......................... 102018000020212

(51) Int. Cl.
*B60W 40/12* (2012.01)
*B60C 23/06* (2006.01)

(52) U.S. Cl.
CPC ........... *B60W 40/12* (2013.01); *B60C 23/061* (2013.01); *B60W 2510/18* (2013.01);
(Continued)

(58) Field of Classification Search
CPC ........... B60W 40/12; B60W 2530/201; B60W 2530/10; B60W 2530/16; B60W 2530/20;
(Continued)

(56) References Cited

U.S. PATENT DOCUMENTS

| | | |
|---|---|---|
| 6,250,421 B1 | 6/2001 | Poshadlo |
| 6,802,213 B1 | 10/2004 | Agrotis |

(Continued)

FOREIGN PATENT DOCUMENTS

| | | |
|---|---|---|
| CN | 109823121 A | 5/2019 |
| EP | 2 995 520 A1 | 3/2016 |

(Continued)

OTHER PUBLICATIONS

English translation of JP H08156538, Jun. 18, 1996. (Year: 1996).*

(Continued)

*Primary Examiner* — Michael P Nghiem
(74) *Attorney, Agent, or Firm* — Merchant & Gould P.C.

(57) ABSTRACT

A method estimates tire pressure of vehicle. For each tire, signals or data indicative of angular velocity of the wheel with which the tire is associated are acquired. A subset of detected signals or data acquired in rectilinear vehicle travel condition is selected. Pressure relationship between tires of each pair of wheels of the same axle is determined by comparing the rolling radius of the wheel on which a first tire is mounted and the rolling radius of the wheel on which a second tire is mounted. A pressure relationship between tire pairs is determined for comparison between the mean value of the rolling radii of wheels of a first axle and the mean value of the rolling radii of wheels of a second axle. Ratios are calculated based on signals or data indicative of angular velocity of the wheels and on slippage of the drive wheels.

13 Claims, 9 Drawing Sheets

(52) U.S. Cl.
CPC ... *B60W 2510/20* (2013.01); *B60W 2520/105* (2013.01); *B60W 2520/26* (2013.01); *B60W 2520/28* (2013.01); *B60W 2520/30* (2013.01); *B60W 2530/10* (2013.01); *B60W 2530/16* (2013.01); *B60W 2530/20* (2013.01); *B60W 2530/201* (2020.02); *B60W 2540/18* (2013.01); *B60W 2552/15* (2020.02); *B60W 2552/40* (2020.02)

(58) Field of Classification Search
CPC ......... B60W 2552/40; B60W 2552/15; B60W 2510/18; B60W 2510/20; B60W 2520/105; B60W 2520/26; B60W 2520/28; B60W 2520/30; B60W 2540/18; B60C 23/061
USPC ....................................................... 702/138
See application file for complete search history.

(56) References Cited

U.S. PATENT DOCUMENTS

| | | | |
|---|---|---|---|
| 7,677,095 B1 | 3/2010 | Bartol | |
| 2005/0109093 A1* | 5/2005 | Martinez Marrufo | B60C 23/061 73/146 |
| 2005/0179528 A1* | 8/2005 | Kawasaki | B60C 23/061 340/443 |
| 2008/0255719 A1* | 10/2008 | Kitano | B60C 23/061 701/33.9 |
| 2014/0305199 A1* | 10/2014 | Hernando | G01M 17/02 73/146 |
| 2020/0300732 A1* | 9/2020 | Tsujita | G01M 17/02 |
| 2020/0300885 A1* | 9/2020 | Fujii | B60C 19/00 |

FOREIGN PATENT DOCUMENTS

| | | |
|---|---|---|
| EP | 3307563 A1 | 4/2018 |
| JP | H08156538 A * | 6/1996 |
| JP | 2004017717 A * | 1/2004 |
| KR | 101879118 B1 | 7/2018 |
| KR | 20180078077 A * | 7/2018 |
| WO | 2004/016455 A2 | 2/2004 |
| WO | 2013114388 A1 | 8/2013 |
| WO | 2016198590 A1 | 12/2016 |

OTHER PUBLICATIONS

English translation of KR 20180078077, Jul. 9, 2018. (Year: 2018).*
English translation of JP 2004017717, Jan. 22, 2004. (Year: 2004).*
International Search Report and Written Opinion of the International Searching Authority for International Patent Application No. PCT/IB2019/061079 mailed Mar. 11, 2020, 8 pages.

* cited by examiner

METHOD FOR ESTIMATING THE PRESSURE OF THE TYRES OF A VEHICLE

CROSS-REFERENCE TO RELATED APPLICATION

This application is a National Stage Application of PCT/IB2019/061079, filed 19 Dec. 2019, which claims benefit of Ser. No. 102018000020212, filed 19 Dec. 2018 in Italy, and which applications are incorporated herein by reference. To the extent appropriate, a claim of priority is made to each of the above-disclosed applications.

FIELD OF THE INVENTION

The present invention concerns a method for estimating the pressure of the tyres of a vehicle.

BACKGROUND OF THE INVENTION

Tyre Pressure Monitoring Systems (TPMS) are increasingly used on vehicles and their mode of operation is regulated, for example, under the European Community Directive ECE-R24 and the regulation FMVSS138 in the United States. A TPMS system performs important functions, including ensuring greater driving safety, avoiding higher fuel consumption caused by under-inflated tyres, and avoiding abnormal tyre wear due to use at an incorrect running pressure.

Tyre pressure monitoring systems are generally integrated into the on-board electronics of the vehicle and constantly monitor the tyre pressure. In the case of air leakage or deflation—even if only partial—of the tyre, a user interface signals the occurrence.

There are two types of tyre pressure monitoring systems currently available that are designed to alert the driver of a vehicle when the tyre pressure is below normal while the vehicle is in motion: direct measurement systems and indirect measurement systems. A direct measurement system provides for the arrangement of pressure sensors on each tyre (generally integrated in the tyre valve) which are capable of communicating with an on-board management system. An indirect measurement system estimates the pressure of one tyre (in absolute value or relative to other tyres) on the basis of another physical quantity substantially correlated to the inflation pressure of the tyre, such as the angular velocity of the wheel.

In direct measurement systems, the absolute pressure measurement is transmitted to a central receiver or their respective antennas which are capable of transmitting the pressure data to a control module arranged to analyze the aforesaid data and send the relevant signals to an information display available to the user (which may be a simple indicator, or a screen containing complete pressure and possibly temperature information on a graphical user interface). The advantages of a direct pressure measurement are the sensitivity to small variations in pressure, the ability to measure the pressure in each tyre at any time, even before the vehicle is running. Disadvantageously, however, these systems are expensive and unsuitable to be installed on tyres repeatedly mounted and removed from wheel rims (for example, when tyres need to be changed according to the seasons of the year).

However, the requirements for detecting an abnormal deflation or inflation condition of a tyre imposed by the regulations are more lax, limiting themselves to providing for the recognition of an abnormal deflation condition over a fairly long period of time, on the order of at least 10 minutes after the occurrence of an event and for deflation rates equal to or greater than 20% of the nominal values expected for the type of vehicle and tyre.

For these reasons, hybrid tyre pressure monitoring systems have also become widespread, comprising a limited number of pressure sensors (normally two), adapted to measure the pressure directly on some tyres and to estimate the inflation condition of the others indirectly.

SUMMARY OF THE INVENTION

The aim of the present invention is to provide an indirect or hybrid tyre pressure monitoring system, which allows a reliable, robust and efficient tyre pressure estimation, avoiding the drawbacks of the prior art of direct-type monitoring systems.

According to the present invention, this aim is achieved by a method for estimating the pressure of tyres of a vehicle as described herein.

Particular embodiments are also described. A system for estimating the pressure of the tyres of a vehicle and a computer program embedded in a non-transitory computer readable medium are also the subject-matter of the invention.

In short, the present invention is based on the principle of indirect measurement of tyre pressure, whereby the relative pressure of a vehicle's tyres is deduced from the measurement of a physical parameter correlated to the tyres themselves, such as the angular velocity of the wheels on which the tyres are mounted, the inflation pressure of each tyre being correlated to the rolling radius assumed by the wheel, the latter being deducible from the angular velocity of the wheel.

The improvement introduced by the invention consists in carrying out the aforesaid estimate on the basis of the angular velocity of the wheels measured in a rectilinear travel condition of the vehicle and on the basis of a quantity indicative of the slippage of the pair of tyres of the drive wheels on the ground. The relative pressure of the tyres of the vehicle is estimated by determining a pressure ratio between the tyres of at least one, and preferably each, pair of wheels belonging to the same axle of the vehicle by comparison of the value of the rolling radius of one tyre and the value of the rolling radius of the other tyre, and by determining a pressure ratio between pairs of tyres of a pair of axles of the vehicle by comparison of the average value of the rolling radius of a first pair of tyres belonging to a first axle of the vehicle and the average value of the rolling radius of a second pair of tyres belonging to a second axle of the vehicle.

In an advantageous embodiment, the installation of at least one pressure sensor on a tyre makes it possible to estimate the absolute pressure of the tyres of the vehicle.

In a further advantageous embodiment, in a learning stage, an actual pressure value of the tyres and a corresponding nominal value of the rolling radius of the wheel are acquired, for example according to at least one parameter such as the tyre model, the state of wear of the tyre, the load condition of the vehicle. The comparison between the value of the rolling radius of one tyre and the value of the rolling radius of the other tyre and the comparison between the average value of the rolling radius of a first pair of tyres belonging to a first axle of the vehicle and the average value of the rolling radius of a second pair of tyres belonging to a second axle of the vehicle, are compared, respectively, with the corresponding quantities calculated on the basis of the nominal values of the rolling radii of the wheels, whereby a condition of deflation of at least one tyre is determined if, as a result of the comparison, the difference between the compared values is greater than a predetermined threshold for the detection of a condition of deflation, preferably variable as a function of a grip index of the drive wheels on the ground and the longitudinal velocity of the vehicle.

BRIEF DESCRIPTION OF THE FIGURES

Further characteristics and advantages of the invention will be described in greater detail in the following detailed description of an embodiment thereof, provided by way of non-limiting example, with reference to the accompanying drawings wherein.

DETAILED DESCRIPTION

Figure 1:
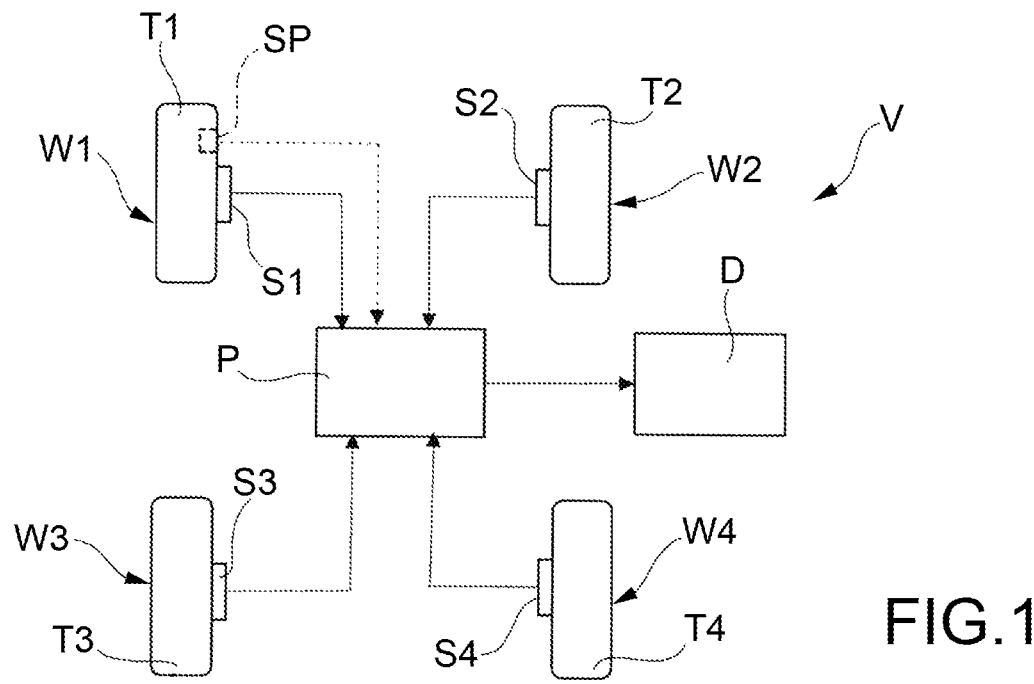
FIG. 1 is a general block representation of a system for estimating the tyre pressure of a vehicle, which is the subject-matter of the invention.

With reference to FIG. 1, a vehicle V is shown in its essential lines with four wheels W1-W4 and an associated pressure estimation system of the tyres, respectively indicated as T1-T4. It comprises sensor devices S1-S4, respectively associated to the wheels W1-W4, including angular velocity sensors to detect the angular velocity of the aforesaid wheels, an optional pressure sensor device SP associated with a wheel and a processing unit P connected at its respective inputs with the sensor devices S1-S4 and possibly with the sensor device SP, if present.

At least one display device D is connected to the processing unit P and is adapted to give an indication to a user of the vehicle of an inflation anomaly of at least one tyre.

The processing unit P is programmed to implement a method for estimating the tyre pressure of a vehicle as better described hereinafter.

It is known to use signals or data available on board the vehicle, for example from sensors S1-S4, to measure at least one quantity representing an indirect index of the inflation pressure of one or more tyres, which may be identified generically according to the following relationship $$I=f(P)$$

where I is the inflation pressure index quantity and P is the inflation pressure.

If the function $f$ is fully known, from the index I it is possible to derive directly the pressure P as $$P=f^{-1}(I)$$

This ideal condition is never met because the relationship $f$ is affected by many unknown variable factors, such as the tyre model, the state of wear of the tyre, the load condition of the vehicle.

However, it is possible to learn the nominal value of the index I at an actual pressure value of a tyre acquired by a known method, for example by means of an on-board pressure sensor SP or by measuring the pressure at a garage, and to determine a deflation of the tyre if the measured value of said index differs from the nominal value for a quantity greater than a predetermined threshold for the detection of a deflation condition.

Figure 2:
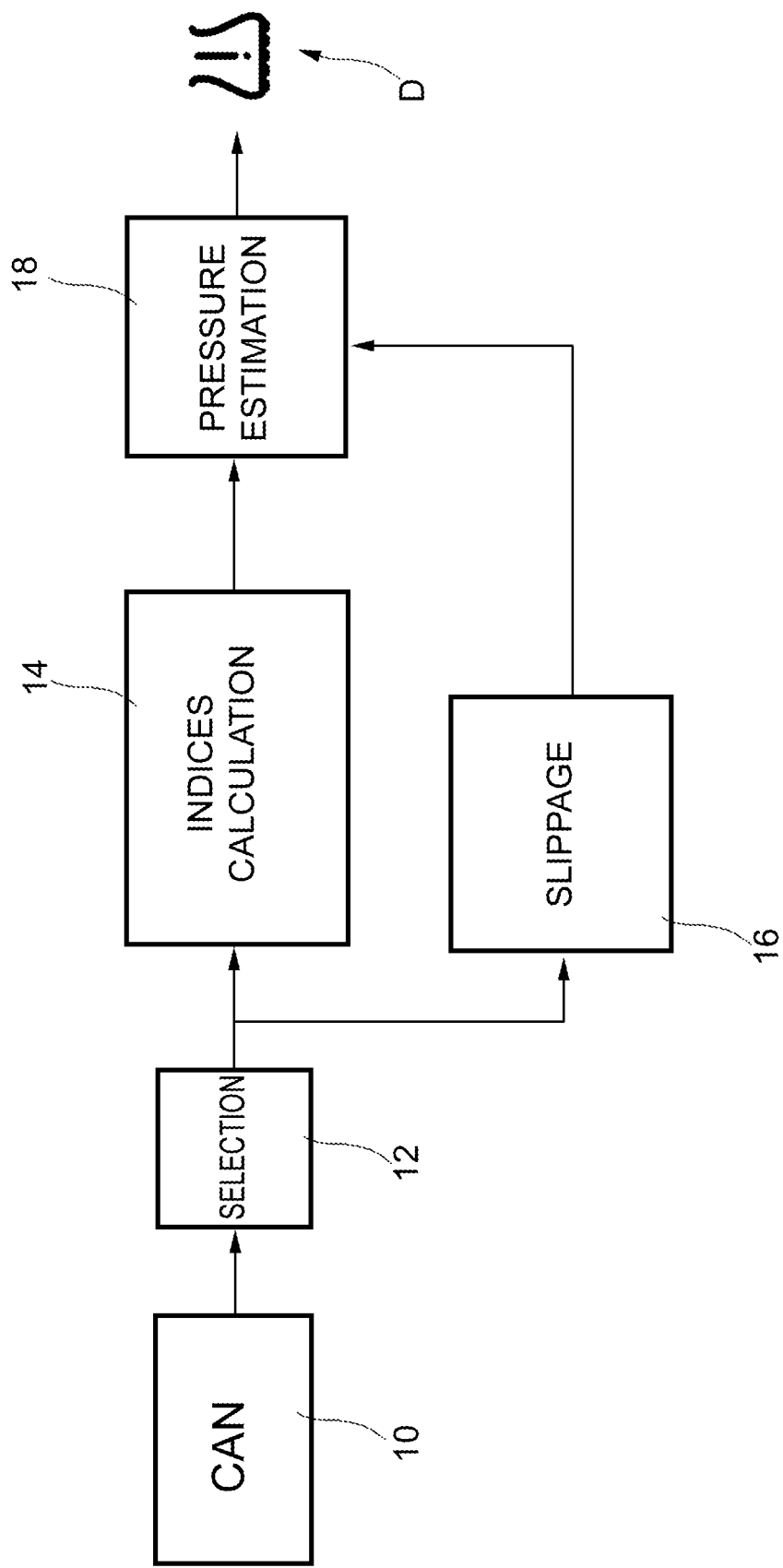
FIG. 2 is a block diagram of a three-index system for estimating the tyre pressure of a vehicle, according to the invention.

A three-index system for estimating the tyre pressure of a vehicle according to the invention is represented in FIG. 2.

Therein, at least one signal, and preferably a plurality of signals or data carried on an on-board CAN network is indicated collectively at 10. A data selection module is indicated at 12 and arranged to select the signals or data 10 provided by the CAN network by generating a subset of said signals or data, which includes—in a currently preferred embodiment—the signals or data detected in a rectilinear travel condition of the vehicle. An index calculation module 14 is located downstream of the selection module 12 and is configured to calculate the value of predefined indexes of the pressure value on the basis of the selected signals or data, as will be described below. In parallel with the module 14, a module 16 is arranged to detect a quantity indicative of the slippage on the ground of the pair of tyres of the drive wheels of the vehicle, on the basis of the signals or data selected. Downstream of the index calculation module 14 and the module 16 for measuring an indicative slippage quantity, a pressure estimation module 18 is provided to obtain estimate data of the tyre pressure on the basis of the data received from the index calculation module 14 according to the slippage on the ground of the pair of tyres of the vehicle's drive wheels measured by the module 16.

The pressure estimation module 18 controls said at least one display device D to represent, at least visually, an indicative signal of an inflation anomaly of at least one tyre.

It is known that the rolling radius of a wheel depends on the pressure of the tyre, according to the general relationship $$R=R(P)$$

where R indicates the rolling radius of the wheel.

Comparing the angular velocity of two wheels together, the relative radii may be calculated, that is, the ratio between the radii, which is the index of a relative deflation of one tyre with respect to another, according to the relationship $$R_{ij} = \frac{R_i}{R_j} = f\left(\frac{\omega_j}{\omega_i}\right)$$

where $\omega_i$ and $\omega_j$ are respectively the angular velocity of the i-th wheel and the j-th wheel, $R_i$ and $R_j$ are respectively the rolling radii of the i-th wheel and the j-th wheel, and $R_{ij}$ is an indicative index of the ratio of said rolling radii, which assumes a unitary value in the condition wherein the rolling radii are equal, i.e. the inflation levels of the respective tyres, thus their pressure values, are equal, independently of the absolute pressure value that is not known.

The preceding considerations make it possible to create a system that, on the basis of three indices, allows the deflation of one, two or three tyres to be detected, but not of all four tyres at the same time.

With $$\hat{R}_{12} = f_1\left(\frac{\omega_2}{\omega_1}\right) \sim \frac{R_1}{R_2}$$

an estimate of the ratio between the rolling radii of a first wheel W1 and a second wheel W2 belonging to the same axle of the vehicle is indicated, in the example case the front axle, which provides information about the deflation of a wheel of said axle.

With $$\hat{R}_{34} = f_2\left(\frac{\omega_4}{\omega_3}\right) \sim \frac{R_3}{R_4}$$

an estimate of the ratio between the rolling radii of a first wheel W3 and a second wheel W4 belonging to the same axle of the vehicle is indicated, in the example case the rear axle, which provides information about the deflation of a wheel of said axle.

With $$\hat{R}_{rf} = f_3\left(\frac{\omega_1 + \omega_2}{\omega_3 + \omega_4}\right) \sim \frac{R_r}{R_f}$$

an estimate of the ratio between the average rolling radius of the rear wheels W3, W4 belonging to the rear axle of the vehicle and the average rolling radius of the front wheels W1, W2 belonging to the front axle of the vehicle is indicated, which provides information about the simultaneous deflation of both wheels on the same axle.

For example, in the case of the ratio between the rolling radii of a first wheel W1 and a second wheel W2, respectively indicated as $R_1$ and $R_2$ in the preceding formula, the following three ideal cases may occur:

$$R_{12} < 1$$

$$R_{12} \sim 1$$

$$R_{12} > 1$$

corresponding to the relative deflation of the tyre of the left front wheel W1 with respect to the tyre of the right front wheel W2, to no relative deflation between the tyres of the front wheels, or to relative deflation of the tyre of the right front wheel W2 with respect to the tyre of the left front wheel W1.

In practice, at a nominal pressure of both tyres, the condition $R_{12}=1$ could not occur because different vertical loads act on the wheels or the tyres have different wear conditions or manufacturing tolerances. In this more general case, it is appropriate to refer to the following conditions:

$$R_{12} < R_{12_{nominal}}$$

$$R_{12} < R_{12_{nominal}}$$

$$R_{12} < R_{12_{nominal}}$$

where the ratio of the rolling radii of the aforesaid wheels is compared with a nominal value of this ratio acquired in a preliminary learning stage, under known inflation conditions.

Defining $$\epsilon_{12} = R_{12} - R_{12_{nominal}}$$

$$\epsilon_{34} = R_{34} - R_{34_{nominal}}$$

$$\epsilon_{rf} = R_{rf} - R_{rf_{nominal}}$$

and $\delta$ the threshold for detecting a deflation condition, the following conditions are given:

(1)

$$\epsilon_{12} < -\delta$$

$$|\epsilon_{12}| < \delta \text{ \& } |\epsilon_{rf}| < \delta$$

$$\epsilon_{12} > \delta$$

which represent a condition of relative deflation of the front left tyre of the wheel W1 with respect to the front right tyre of the wheel W2, a condition of no relative deflation between the front wheel tyres and a condition of relative deflation of the front right tyre of the wheel W2 with respect to the rear left tyre of the wheel W1, respectively;

(2)

$$\epsilon_{34} < -\delta$$

$$|\epsilon_{34}| < \delta \text{ \& } |\epsilon_{rf}| < \delta$$

$$\epsilon_{34} > \delta$$

which represent a condition of relative deflation of the rear left tyre of the wheel W3 with respect to the rear right tyre of the wheel W4, a condition of no relative deflation between the rear wheel tyres and a condition of relative deflation of the rear right tyre of the wheel W4 with respect to the rear left tyre of the wheel W4, respectively;

(3)

$$|\epsilon_{rf}| > \delta \text{ \& } |\epsilon_{12}| < \delta$$

$$\epsilon_{rf} < -\delta \text{ \& } |\epsilon_{12}| < \delta$$

which represent a condition of relative deflation of the front tyres of the wheels W1 and W2 with respect to the rear tyres of the wheels W3 and W4 and a condition of relative deflation of the rear tyres of the wheels W3 and W4 with respect to the front tyres of the wheels W1 and W2, respectively;

(4)

$$\epsilon_{12} < -\delta \text{ \& } \epsilon_{rf} < 0$$

$$\epsilon_{12} > \delta \text{ \& } \epsilon_{rf} > 0$$

which represent a condition of relative deflation of the tyres of the wheels W1, W3 and W4 with respect to the front tyre of the wheel W2 and a condition of relative deflation of the tyres of the wheels W2, W3 and W4 with respect to the front tyre of the wheel W1, respectively; and (5)

$$\epsilon_{34} < -\delta \,\&\, \epsilon_{rf} < 0$$
$$\epsilon_{34} > \delta \,\&\, \epsilon_{rf} > 0$$

which represent a condition of relative deflation of the tyres of the wheels W1, W2 and W3 with respect to the rear tyre of the wheel W4 and a condition of relative deflation of the tyres of the wheels W1, W2 and W4 with respect to the rear tyre of the wheel W3, respectively.

Figure 3:
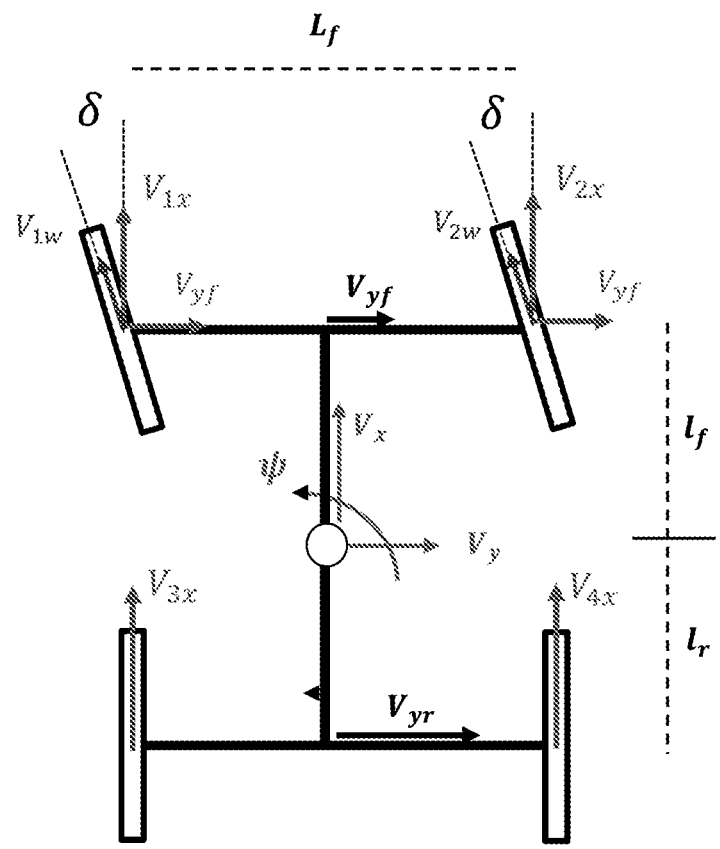
FIG. 3 is a kinematic vehicle model used in the method of the invention.

The calculation of the aforementioned indices refers to the travel parameters of the vehicle and to measurable quantities, such as the angular velocity of the wheels, according to the following relationships defined with reference to the vehicle kinematic model shown in FIG. 3:

$$\begin{cases} R_1\omega_1(1-\lambda_1) = \left(V_x - \frac{L_f}{2}\psi\right)\cos\delta - (V_y - l_f\psi)\sin\delta \\ R_2\omega_2(1-\lambda_2) = \left(V_x - \frac{L_f}{2}\psi\right)\cos\delta - (V_y - l_f\psi)\sin\delta \\ R_3\omega_3(1-\lambda_3) = \left(V_x - \frac{L_f}{2}\psi\right) \\ R_4\omega_4(1-\lambda_4) = \left(V_x - \frac{L_f}{2}\psi\right) \end{cases}$$

and $$\begin{cases} \frac{\omega_2}{\omega_1} = \frac{R_1(1-\lambda_1)}{R_2(1-\lambda_2)} + \frac{L_f}{R_2(1-\lambda_2)}\left(\cos\delta * \frac{\psi}{\omega_1}\right) \\ \frac{\omega_4}{\omega_3} = \frac{R_3(1-\lambda_3)}{R_4(1-\lambda_4)} + \frac{L_f}{R_4(1-\lambda_4)}\left(\frac{\psi}{\omega_3}\right) \end{cases}$$

where $\omega_i$ are the angular velocities of each wheel W1-W4, with i=1, 2, 3, 4, $\lambda_i$ are the slippages of each wheel W1-W4, with i=1, 2, 3, 4, $V_x$ and $V_y$ are respectively the longitudinal and transverse velocity components applied to the center of mass of the vehicle, $L_f$ and $L_r$ are respectively the front and rear track widths of the vehicle axles, $l_f$ and $l_r$ are respectively the front and rear half-wheelbase of the vehicle, $\psi$ is the derivative in time of the direction of travel of the vehicle and $\delta$ is the steering angle of the steering wheels of the vehicle.

The angular velocities of each wheel W1-W4 are measured by wheel revolution sensors of the phonic wheel type, e.g. sensors of a vehicle ABS system, the slippages of each wheel W1-W4 are calculated from the measured wheel velocities, the longitudinal velocity is calculated as an average of the wheel velocities, the front and rear track widths of the vehicle axles and the front and rear half-wheelbase of the vehicle are known and the steering angle of the vehicle's steering wheels is measured by an encoder. The signals or data of angular velocity, slippage, longitudinal and transverse velocity, yaw and steering are collectively indicated at 10 in FIG. 2 and acquired by the on-board CAN network.

Assuming the assumptions of a rear-wheel drive vehicle, whereby there is no slippage of the front wheel W1 e W2, i.e. $\lambda_1=\lambda_2=0$, and rectilinear travel, whereby $\psi=\delta=0$, where there is a uniform assumption of rear-wheel drive slippage, i.e. $\lambda_3=\lambda_4$, the preceding equations are simplified as follows $$\begin{cases} \frac{\omega_2}{\omega_1} = \frac{R_1(1-0)}{R_2(1-0)} + 0 \\ \frac{\omega_4}{\omega_3} = \frac{R_3(1-1)}{R_4(1-1)} + 0 \end{cases}$$

obtaining $$\begin{cases} \frac{\omega_2}{\omega_1} = \frac{R_1}{R_2} \\ \frac{\omega_4}{\omega_3} = \frac{R_3}{R_4} \end{cases}$$

The assumptions referred to here are achieved by selecting the signals or data acquired through the selection module 12 and, advantageously, the ratios between the rolling radii of the front and rear wheels $$\hat{R}_{12} = f_1\left(\frac{\omega_2}{\omega_1}\right) \sim \frac{R_1}{R_2}$$

and $$\hat{R}_{34} = f_2\left(\frac{\omega_4}{\omega_3}\right) \sim \frac{R_3}{R_4}$$

are filtered, for example, at 0.1 Hz. i.e.

$$\begin{cases} \hat{R}_{12} = \text{filt}_{0.1\ Hz}\left(\frac{\omega_2}{\omega_1}\right) \\ \hat{R}_{34} = \text{filt}_{0.1\ Hz}\left(\frac{\omega_4}{\omega_3}\right) \end{cases}$$

to remove high-frequency noise due to quantization of the measurement and to the dynamics of the sensor.

Figure 4A:
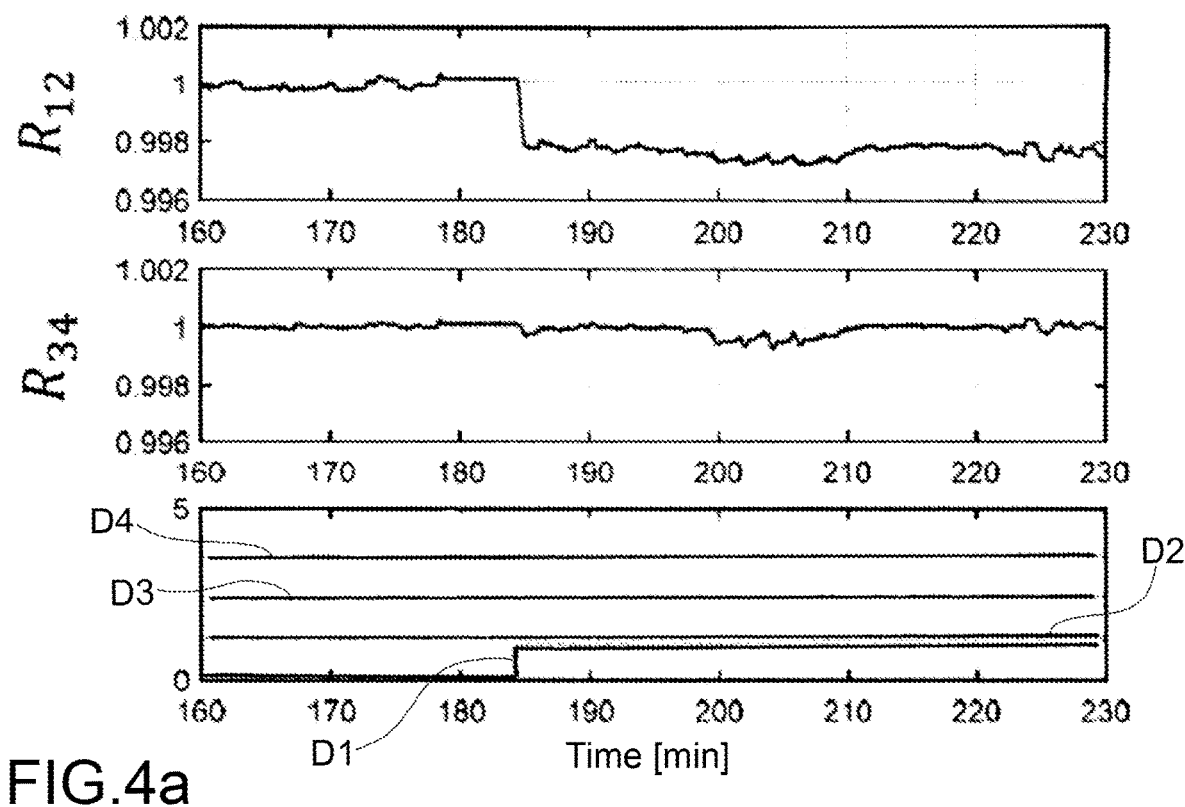
FIGS. 4a and 4b are graphs indicative of the detection of a deflation condition of a tyre, respectively of a front axle and a rear axle of the vehicle.
Figure 4B:
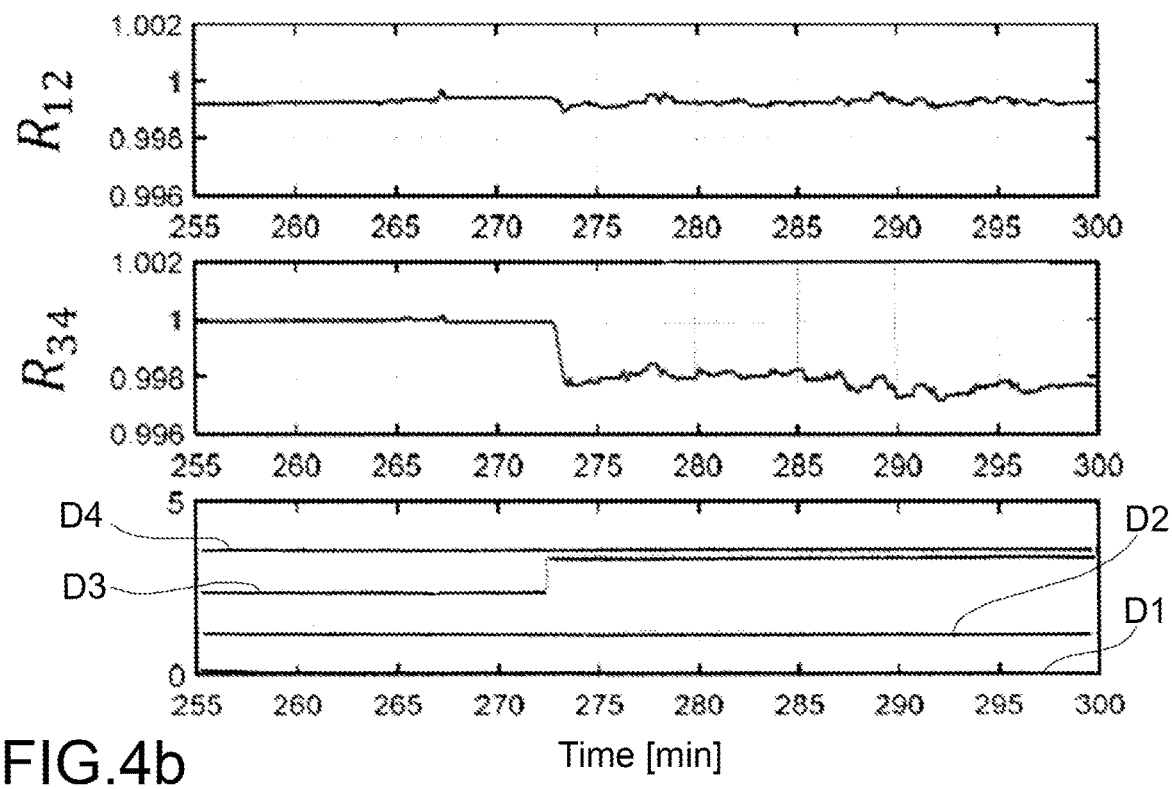

In FIGS. 4a and 4b three graphs are reproduced, by way of example, showing respectively—from top to bottom—the trend over time of the ratio between the rolling radii of the front wheels $R_{12}$, the trend over time of the ratio between the rolling radii of the rear wheels $R_{34}$ and the trend over time of the digital anomaly signals D1-D4, indicative of a deflation condition of the tyres associated respectively with the wheels W1-W4 (the notation R indicates the true radius, while notation $\hat{R}$ indicates an estimate of R; since the value R of the radius is not available, each time it is referred to in the course of the description, it is to be understood as a value $\hat{R}$). FIG. 4a shows the case wherein at the time to a variation of 0.2% (corresponding to 0.7 mm) of the rolling radius of the wheel W1 is detected with respect to the rolling radius of the wheel W2, interpreted as a condition of deflation of the tyre associated with the wheel W1, and indicated by the switching of the anomaly signal D1 from a low logic level to a high logic level. FIG. 4b shows the case wherein at the time to a variation of 0.2% (corresponding to 0.7 mm) of the rolling radius of the wheel W3 with respect to the rolling radius of the wheel W4 is detected, interpreted as a condition of deflation of the tyre associated with the wheel W3, and signaled by the switching of the anomaly signal D3 from a low logic level to a high logic level, by comparison with a threshold $\delta$ for the detection of a deflation condition the default value of which is—in the case of predetermined tyre models $-\delta=0.0012$.

Figure 5:
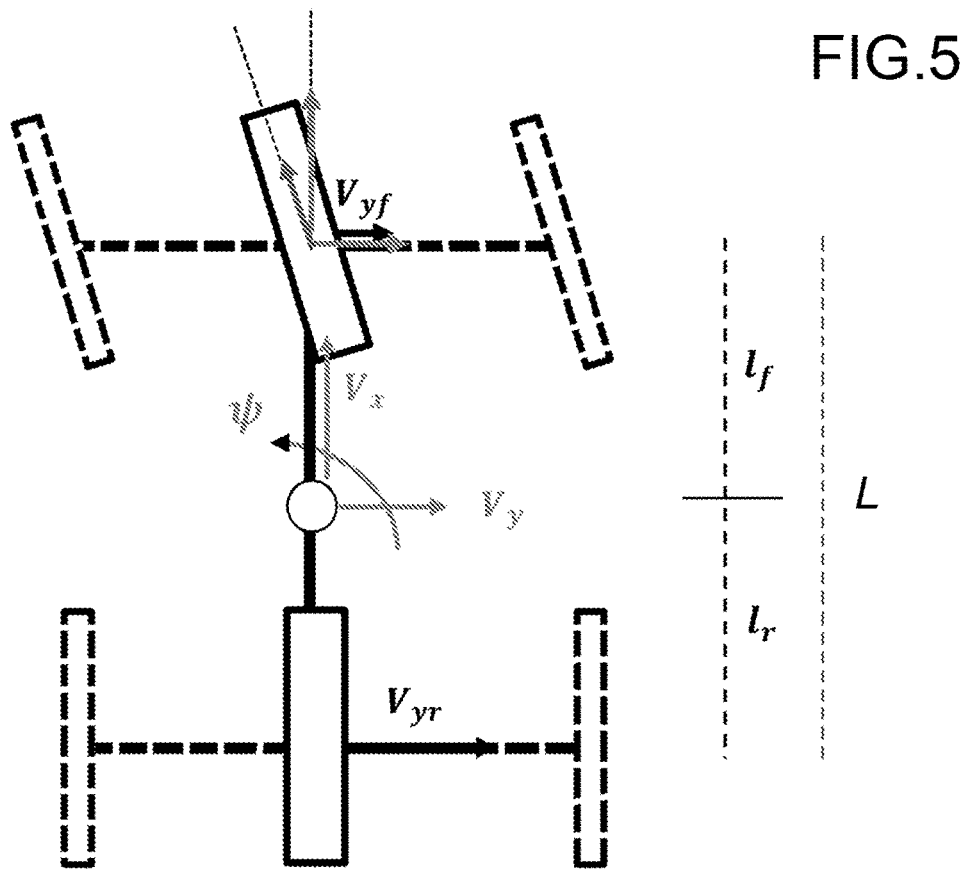
FIG. 5 is a further kinematic vehicle model used in the method of the invention.

With reference to the kinematic vehicle model illustrated in FIG. 5, the following relationships between the average rolling radii of the front wheels and the average rolling radii of the rear wheels are defined.

$$\begin{cases} R_j\omega_f(1-0) = V_x - 0 \\ R_r\omega_r(1-\lambda_r) = V_x \end{cases}$$

where $R_f$ is the average rolling radius of the front wheels W1 and W2, $R_r$ is the average rolling radius of the rear wheels W3 and W4, $$\omega_f = \frac{\omega_1 + \omega_2}{2}$$

and $$\omega_r = \frac{\omega_3 + \omega_4}{2}.$$

With the assumptions—similar to those above—that the vehicle is a rear-wheel drive vehicle, whereby there is no slippage of the front wheel W1 and W2, i.e. $\lambda_f=0$, and with rectilinear travel, whereby $\dot{\psi}=\dot{\theta}=0$, where there is a uniform assumption of drive-wheel slippage, i.e. $\lambda_3=\lambda_4$, the preceding equations are simplified as follows $$\frac{\omega_f}{\omega_r} = \frac{R_r}{R_f} - \frac{R_r}{R_f}\lambda_r$$

and it is necessary to estimate the longitudinal slippage component of the rear wheels $\lambda_r$.

Figure 6:
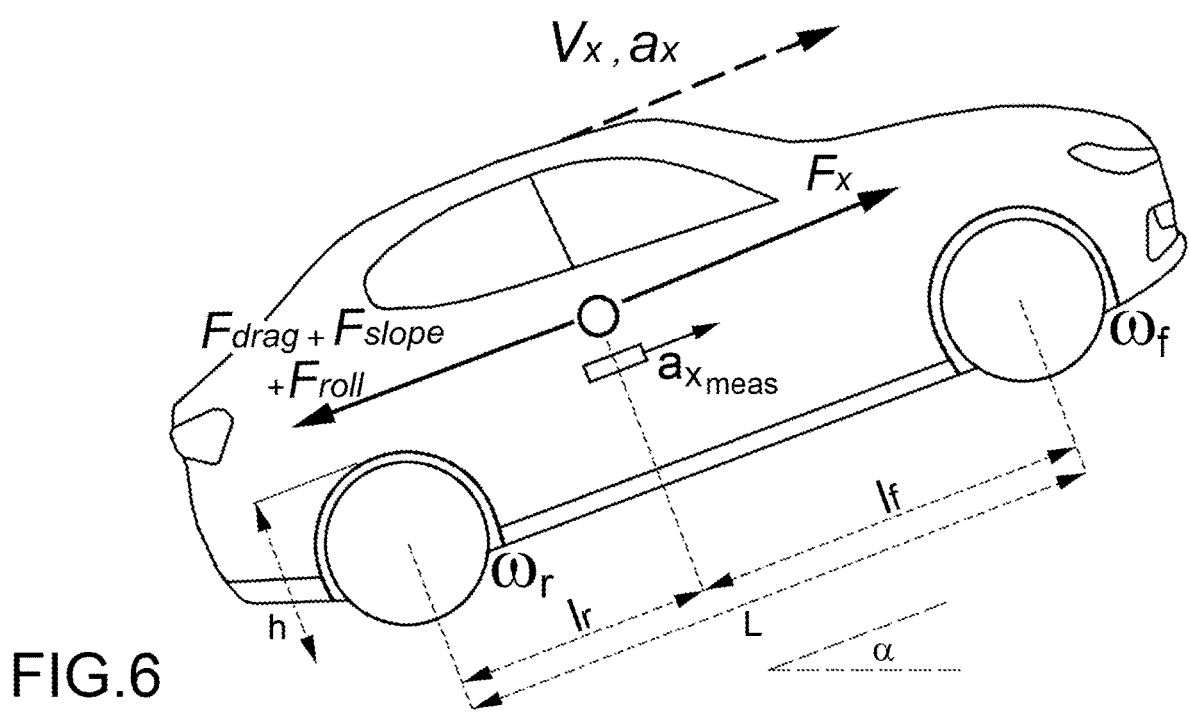
FIG. 6 is an indication of the physical quantities underlying the method according to the invention.

To do this, the following considerations are used, referring to physical quantities associated with a vehicle V represented, for ease of understanding, in FIG. 6.

Assuming to operate in the linear zone of the Pacejka curve, the forward longitudinal force $F_x$ is given by the formula $$F_x = F_{zr} * \mu(\lambda r) \sim F_{zr}\mu_1\lambda_r$$

where $F_{zr}$ is the force acting vertically on the rear wheels given by:

$$F_{zr} = \frac{l_f}{L}Mg + \frac{Ma_x h}{L}$$

where the second term is negligible because the effect of load transfer over long periods of travel is statistically negligible, and $$\mu_1 = \frac{\partial \mu(\lambda_r)}{\partial \lambda_r}$$

$\mu$ being the longitudinal friction coefficient which corresponds to the ratio of the longitudinal force and the normal force.

Indicating with $F_{drag}$, $F_{slope}$ and $F_{roll}$ respectively the aerodynamic force, the slope force related to the case of the vehicle running on a non-horizontal surface, and the rolling force, all ideally applied to the center of mass of the vehicle in the direction opposite to the longitudinal forward force $F_x$, where $$F_{slope} = Mg \sin(\alpha)$$

$$F_{drag} = cV_x^2$$

it is recognized that $$Ma_x = F_x - F_{drag} - F_{slope} - F_{roll}$$

where M is the mass of the vehicle and $a_x$ its longitudinal acceleration, given by $$a_{x_{meas}} = a_x + g \sin(\alpha)$$

the longitudinal acceleration signal not being compensated due to the inclination of the vehicle by an angle $\alpha$ with respect to a horizontal plane of travel.

From the above one may deduce $$\begin{cases} \lambda_r = \frac{L}{l_f g \mu_1} a_{x_{meas}} + \frac{L}{l_f g \mu_1} * \frac{c}{M} * V_x^2 + \frac{L}{l_f g \mu_1} * \frac{F_{roll}}{M} \\ \frac{\omega_f}{\omega_r} = \frac{R_r}{R_f} - \frac{R_r}{R_f}\lambda_r \end{cases}$$

and $$\frac{\omega_f}{\omega_r} = \frac{R_r}{R_f} - \frac{R_r L}{R_f l_f g \mu_1} a_{x_{meas}} - \frac{R_r L}{R_f l_f g \mu_1} * \frac{c}{M} * V_x^2 - \frac{R_r L}{R_f l_f g \mu_1} * \frac{F_{roll}}{M}$$

where, considering $$\tilde{k} = \frac{R_r L}{R_f l_f g \mu_1}$$

one obtains $$\frac{\omega_f}{\omega_r} = \frac{R_r}{R_f} + \tilde{k}\left(a_{x_{meas}} + \frac{c}{M}V_x^2 + \frac{F_{roll}}{M}\right)$$

wherein $R_r/R_f$ is the index to be estimated and $\tilde{k}$ is the grip index of the vehicle, proportional to $1/\mu_1$ and where it is still possible to write $$a_{x_{corrected}} = a_{x_{meas}} + \frac{c}{M}V_x^2 + \frac{F_{roll}}{M}$$

where the parameters c/M and $F_{roll}$/M depend on uncertain factors such as vehicle mass, wheel type (e.g. tyre compound and wheel size, which determine the interaction with the road), the road profile, the wind velocity, any change in the aerodynamic profile of the vehicle due to the presence of cargo carriers or bars on the roof of the vehicle, are not known a priori but may be determined at a calibration stage or statistically estimated on the basis of preliminary test results.

Figure 7:
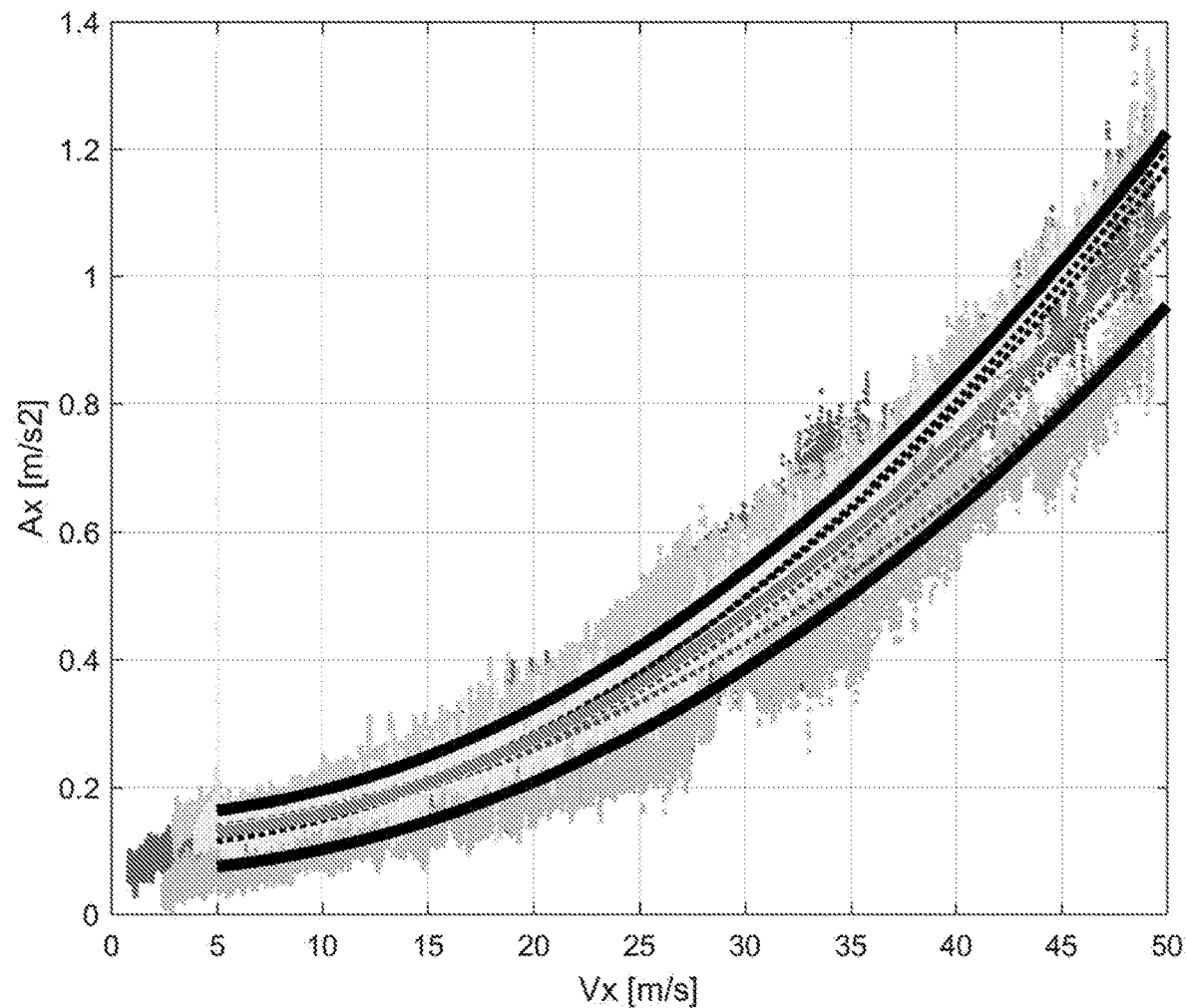
FIG. 7 is a graph showing the trend of parameters affecting the longitudinal acceleration of a vehicle under experimental conditions.

The parameters c/M and $F_{roll}$/M may be obtained during the preliminary calibration experimentally, for a given vehicle, by measuring the acceleration of the vehicle by means of calibrated accelerometers and the longitudinal velocity of the vehicle by means of encoders coupled to the wheels of the vehicle and by applying known methods of regression analysis. For example, the inventors have estimated the parameters c/M and $F_{roll}$/M for a prototype vehicle used in tests as $$\frac{F_{roll}}{M} = 0.1086$$

$$\frac{\hat{c}}{M} = 3.92e - 4$$

minimizing the maximum error between the different tests conducted, the results of which are shown in the graph in FIG. 7, in which the four curves drawn represent coasting down tests where the vehicle starts up from a standstill and then decelerates, the coasting down tests being known to a person skilled in the art to determine the friction parameters and resistance for a specific vehicle.

Figure 8:
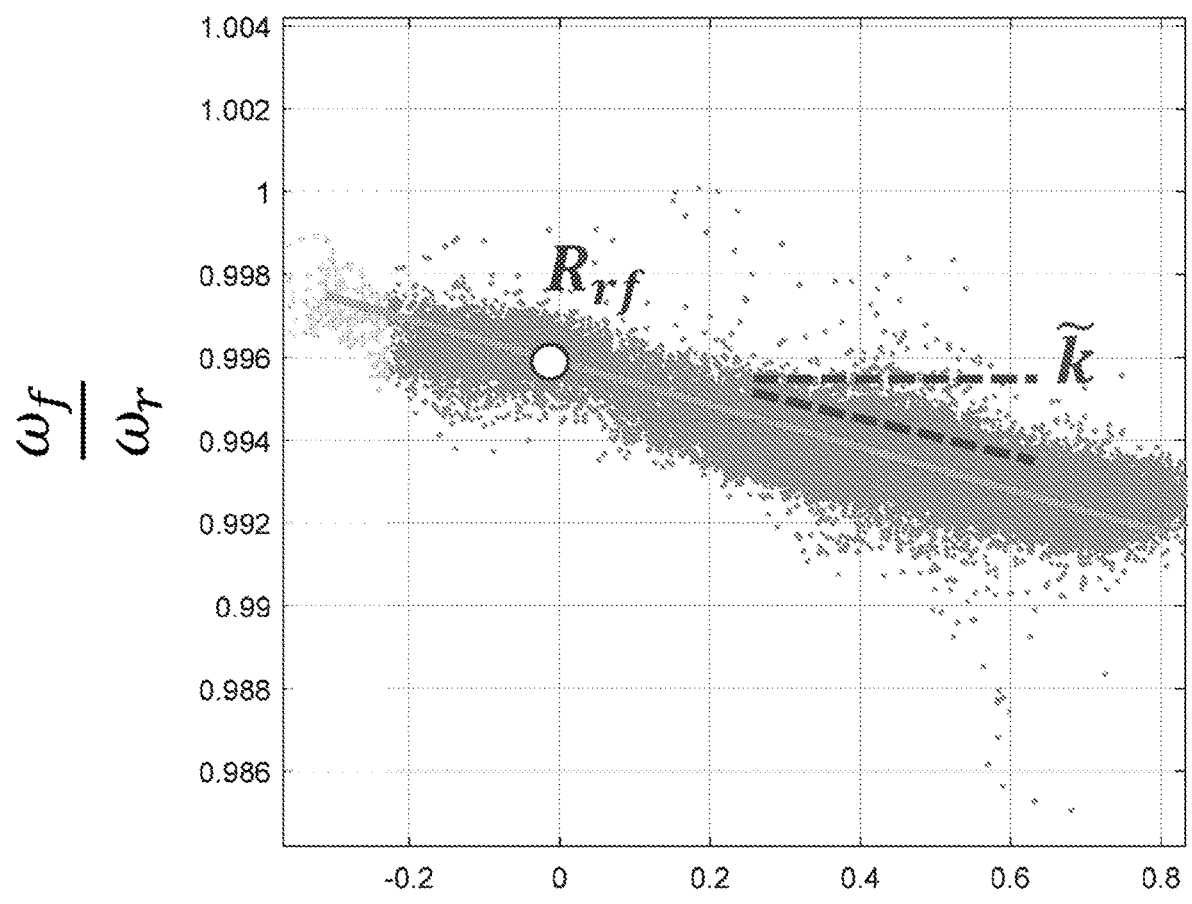
FIG. 8 is a graphical representation of a regression analysis technique.

The synthetic expression of the previous relationship is:

$$\frac{\omega_f}{\omega_r} = R_{rf} + \tilde{k} a_{x_{corrected}}$$

where $\omega_f/\omega_r$ and $a_{x\_corrected}$ are measured or measurable signals or even data that may be calculated on the basis of the results of some measurements, while $R_{rf}$ and $\tilde{k}$ are parameters to be estimated, for example by applying known methods of regression analysis such as a technique of recursive least squares, represented as an example in FIG. 8.

Figure 9:
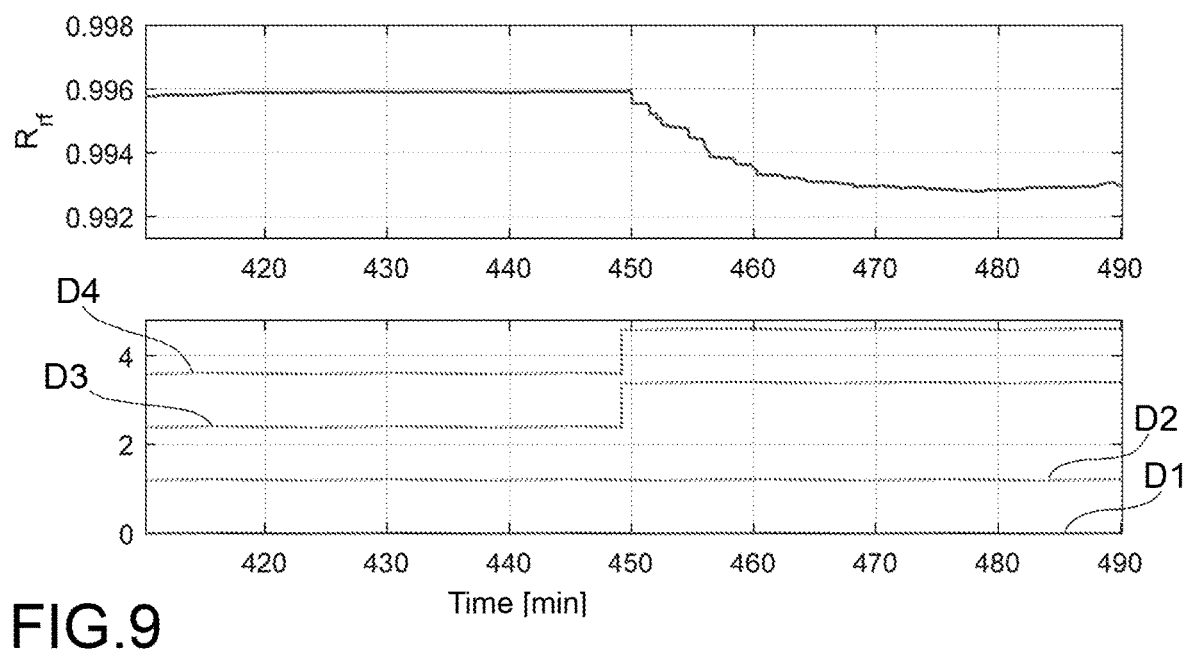
FIG. 9 shows graphs indicating the detection of a relative deflation condition of the rear axle tyres with respect to the front axle tyres.

FIG. 9 shows, by way of example, two graphs showing respectively—from top to bottom—the trend over time of the ratio between the average rolling radii of the rear wheels and the average rolling radii of the front wheels, indicated collectively at $R_{rf}$, and the trend over time of the digital signals of anomaly D1-D4, indicative of a condition of deflation of the tyres associated respectively with the wheels W1-W4. FIG. 9 shows the case wherein at the time to a variation of 0.3% (corresponding to about 1 mm) of the average rolling radius of the rear wheels W3 and W4 is detected with respect to the rolling radius of the front wheels W1 and W2, interpreted as a condition of deflation of the tyres associated with the rear wheels W3 and W4, and signaled by the switching of the anomaly signal D3, D4 from a low logic level to a high logic level, by comparison with a threshold $\delta_{rf}$ for the detection of a deflation condition the predetermined value of which is a function of the tyre model.

It is important to note that $a_{x\_corrected}$, being based on the parameters c/M and $F_{roll}$/M which are preliminarily identifiable and constant, but influenced in their current value by multiple factors such as vehicle mass, wheel type, road profile, wind velocity, modification of the aerodynamic profile of the vehicle, is potentially affected by an error depending on the current velocity of the vehicle, which introduces an estimation error of $R_{rf}$. Assuming a learning stage is conducted in a condition of high grip (ideal), the estimation error on $R_{rf}$ due to the compensation uncertainties of the acceleration may be expressed as:

$$\delta R_{rf} = |R_{rf_{learning}} - R_{rf_{online}}| = (|\tilde{k}_{high}| + |\tilde{k}_{online}|) * \in_{F_{resMAX}} (V_x)$$

where $|\tilde{k}_{high}|$ is the grip index in conditions of high grip in the learning stage;

$|\tilde{k}_{online}|$ is the grip index in the current execution conditions of the estimation process; and $\in_{F_{resMAX}} (V_x)$ is the error on the value of $A_x$ in the worst case.

Figure 10:
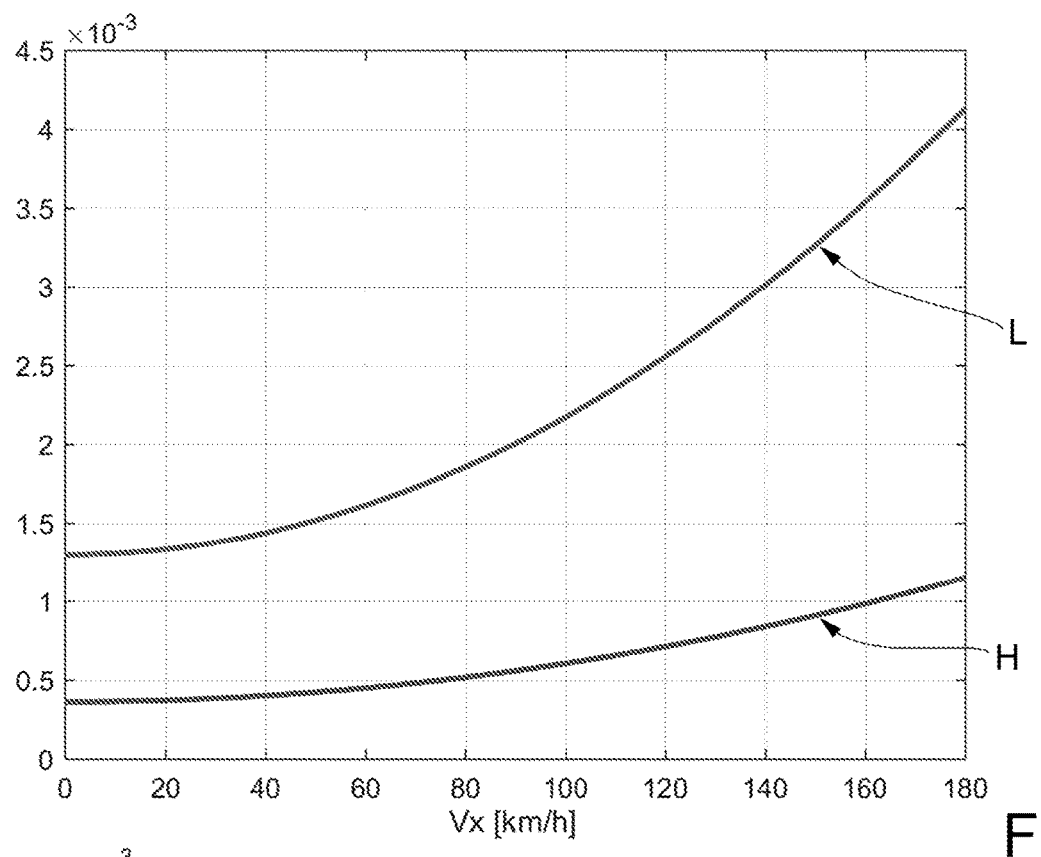
FIG. 10 is a graph showing the variation of a relative deflation index as a function of the grip conditions.

Considering experimental conditions, the inventors have found that the sensitivity of $R_{rf}$ to the uncertainties of the parameters c/M and $F_{roll}$/M is amplified in conditions of low grip, as shown in the graph in FIG. 10, in which the curve L indicates the trend of the variation $R_{rf}$ as a function of the longitudinal velocity of the vehicle in a condition of low grip and the curve H indicates the trend of the variation $R_{rf}$ as a function of the longitudinal velocity of the vehicle in a condition of high grip.

It is therefore expedient to increase the tolerances on the pressure values, i.e. to relax the detection tolerances, in conditions of low grip and high velocity, and this condition may be advantageously implemented by the module 18 estimating the pressure on the basis of the data indicative of the slippage on the ground of the pair of tyres of the vehicle's drive wheels provided by the module 16 and on the basis of the current longitudinal velocity data of the vehicle provided by the CAN 10 network.

Figure 11:
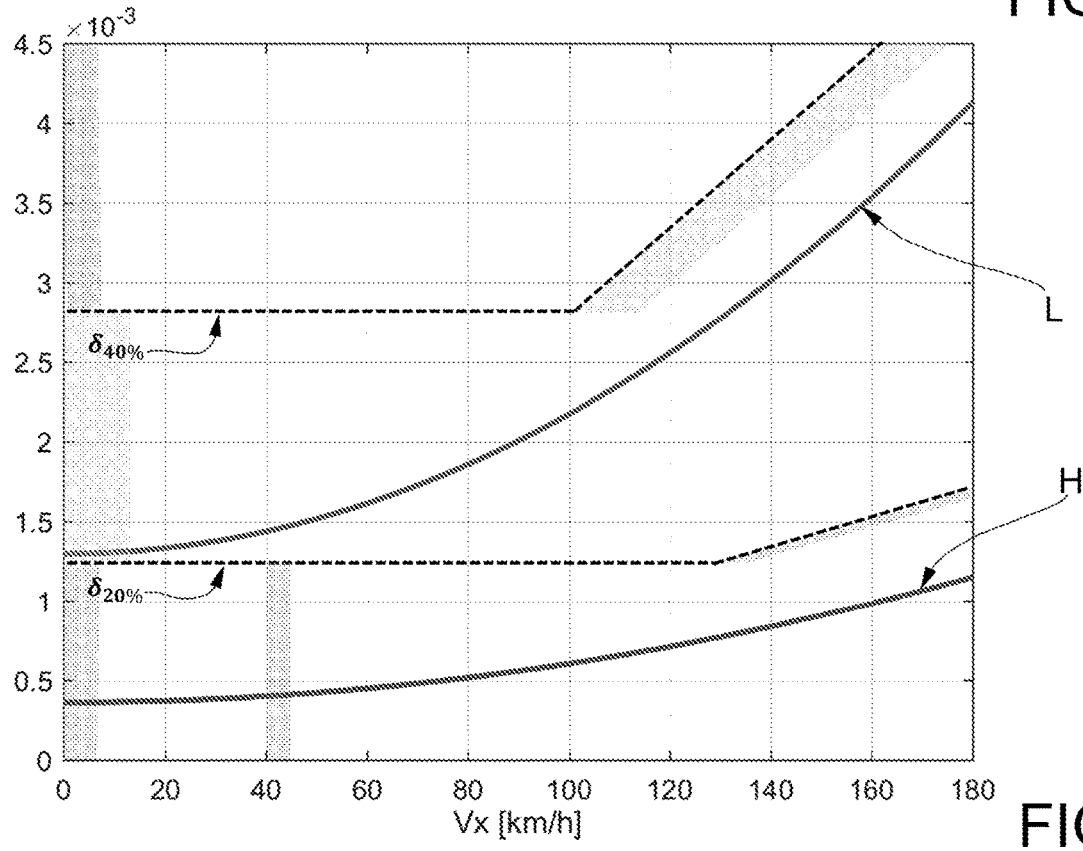
FIG. 11 is a graph showing the trend of thresholds for detecting the deflation of a tyre as a function of the variation of the relative deflation index represented in FIG. 10.

In FIG. 11 the trend of the curves L, H of variation of $R_{rf}$ as a function of the longitudinal velocity of the vehicle and of the grip conditions is shown superimposed on two curves $\delta_{20}$ and $\delta_{40}$ representing the development of the threshold $\delta$ for the detection of a deflation condition, adapted to the grip conditions and to the current velocity of the vehicle to ensure the detection of a deflation condition of at least 20% in conditions of high grip and for speeds up to 130 km/h, the detection of a deflation condition of at least 40% in conditions of low grip and for speeds up to 100 km/h and the absence of false positives due to the uncertainties considered (excluding uncertainties related to wind velocity, road conditions and variations in aerodynamics).

Figure 12A:
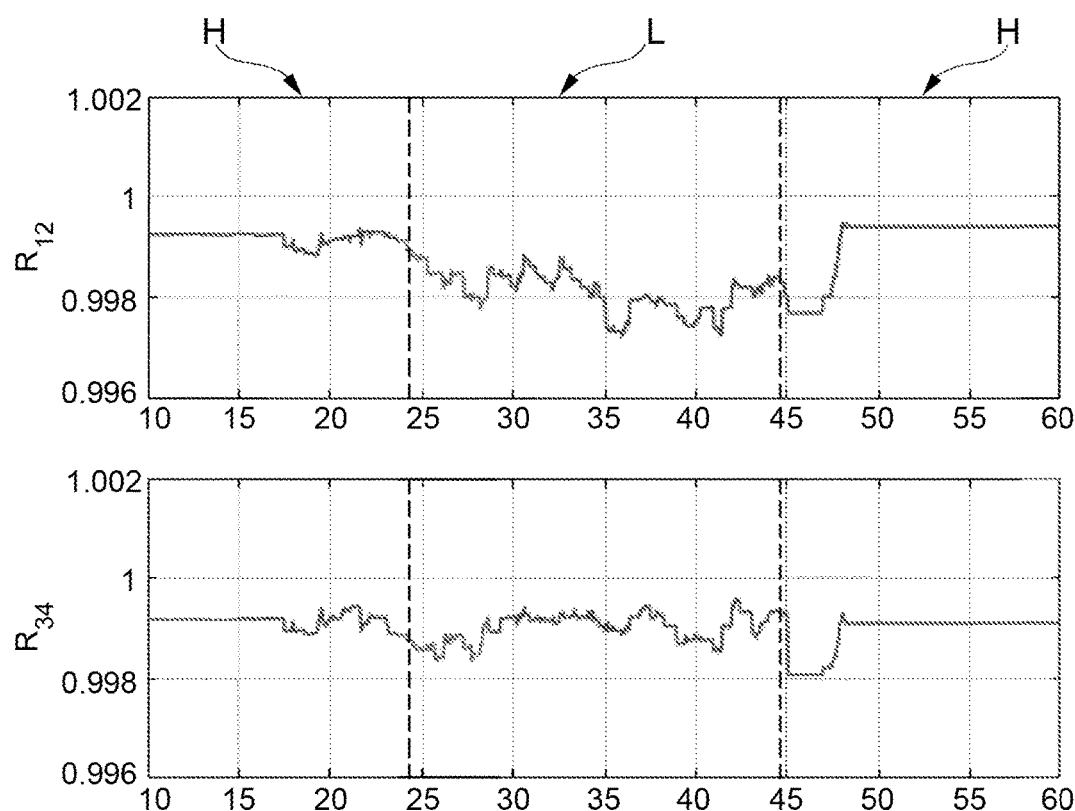
FIGS. 12a and 12b show the trend of deflation indices in different grip conditions.
Figure 12B:
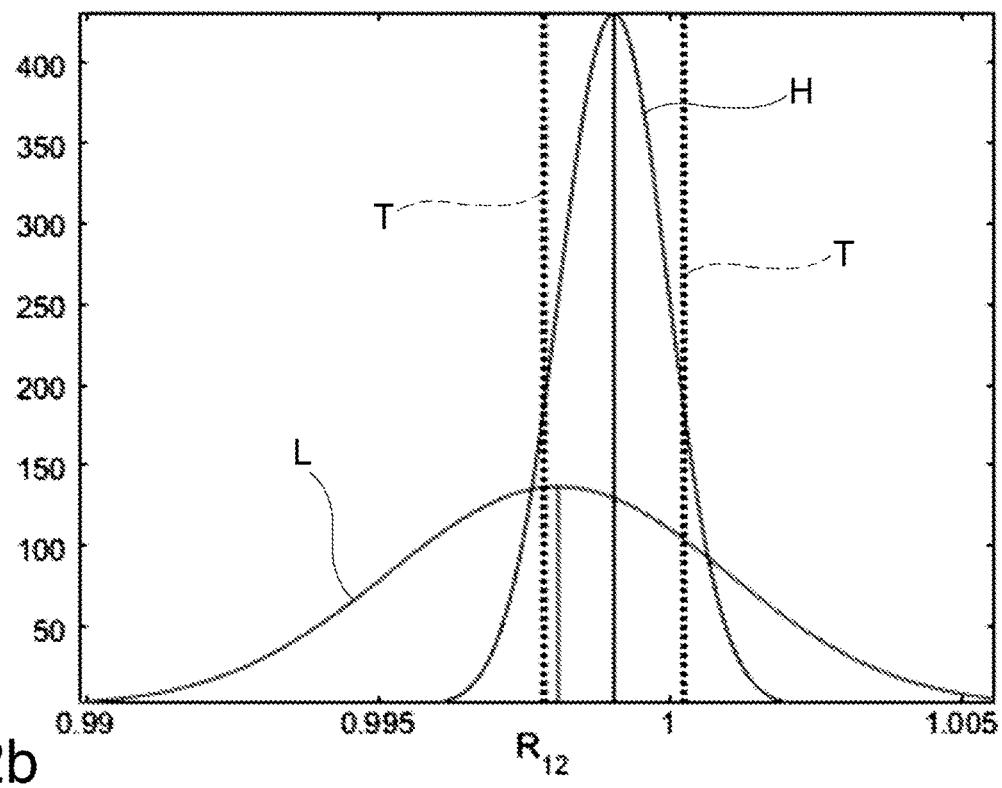

The inventors have acknowledged that low grip conditions, such as those encountered in off-road driving, also influence the trend of indices $R_{12}$ and $R_{34}$, as shown in FIGS. 12a and 12b, which respectively represent the trend of indices $R_{12}$ and $R_{34}$ over time in the passage between a high grip zone H and a low grip zone L and the distribution of the values assumed by the example index $R_{12}$) in the different grip conditions. The graph in FIG. 12b shows, in particular, a first distribution H of the values assumed by the index $R_{12}$ in the condition of high grip and a second distribution L of the values assumed by the index $R_{12}$ in the condition of low grip, the distribution L presenting a greater standard deviation (indicative of a more "noisy" index $R_{12}$) and an average value deviating from the average value of the distribution H and close to the threshold 320 represented by the vertical line T.

Figure 13:
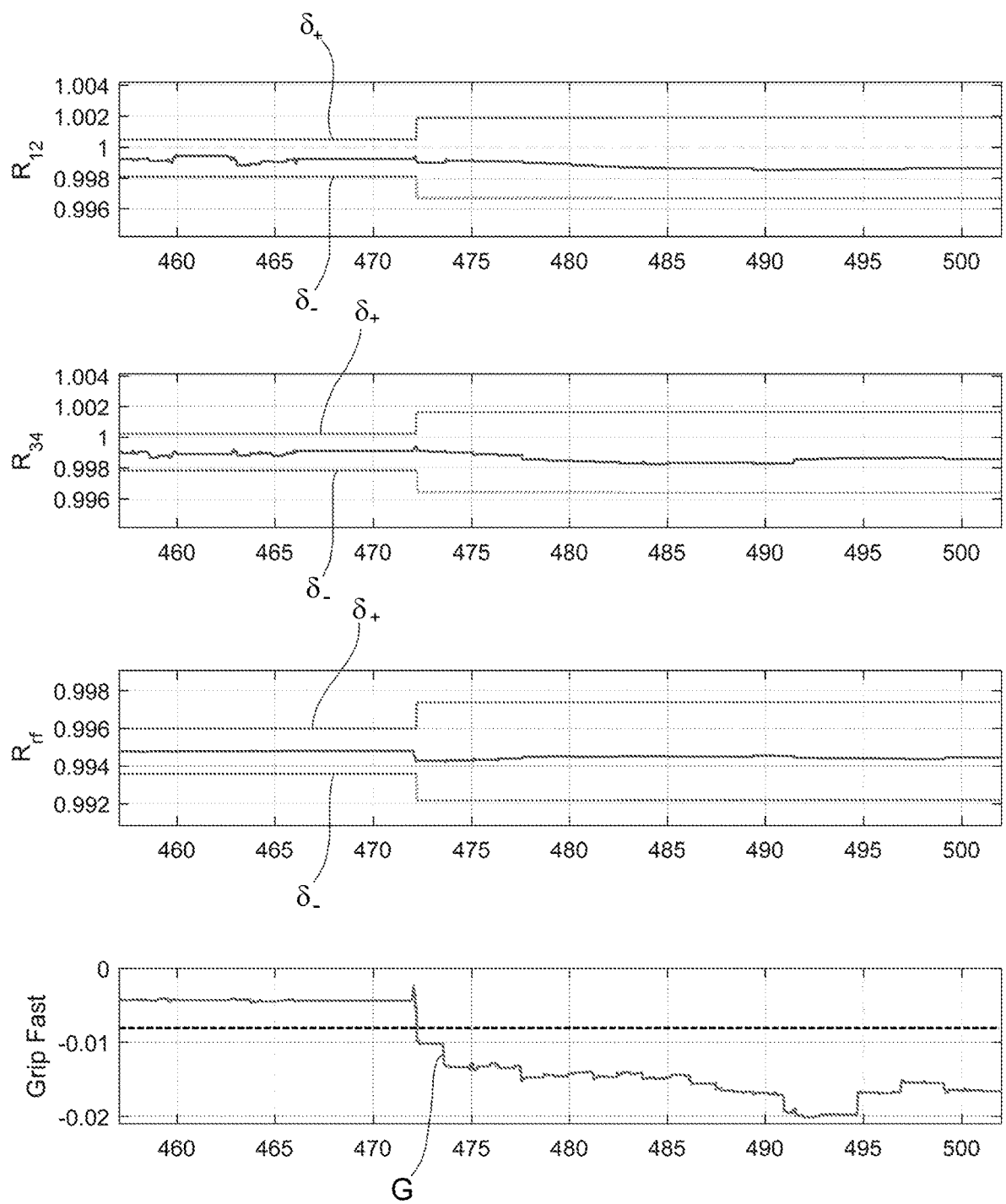
FIG. 13 shows the trend over time of the deflation indices of all tyres on a four-wheeled vehicle and the represented grip conditions, together with the trend over time of the threshold curves for detecting a deflation condition.

FIG. 13 shows the trend over time of the deflation indices $R_{12}$, $R_{34}$ and $R_{rf}$ and of the grip conditions represented by the curve G of the graph below, together with the trend over time of the threshold curves $\delta_+$ and $\delta_-$ for the detection of a deflation condition, the step variation of which is determined by the detection of the variation of the grip conditions, and assumes, by way of example, values equal to:

$$\delta_{12} = \delta_{34} = \begin{cases} 0.0012 \; HighGrip \\ 0.0028 \; LowGrip \end{cases}$$

For this reason, preferably, detection of the change in grip conditions should be as rapid as possible, for example by performing a regression analysis of the curve $$\frac{\omega_f}{\omega_r} = R_{rf} + \tilde{k} a_{x_{corrected}}$$

for the application of the technique of recursive least squares with forgetting factor $f_f$ equal to 0.999 (instead of $f_f$=0.9999 as for example adoptable in the regression analysis aimed to obtain the index $R_{rf}$).

Naturally, since the implementation of a system for estimating the pressure of the tyres of a vehicle according to the three-index approach described in the previous section allows for the deflation of one, two or three tyres to be detected, but not of all four tyres at the same time, nor for the absolute values of the tyre pressure to be determined, a further refinement to the system of the invention may be made using the signals or measurement data of at least one actual pressure of a tyre provided by a sensor SP, shown in FIG. 1 as an option.

The knowledge of at least one actual pressure of a tyre allows a deflation condition of all four tyres of the vehicle to be estimated if the conditions of absence of anomaly found by the determination of the three indices ($R_{12}$, $R_{34}$, $R_{rf}$) and of pressure measured by the single sensor lower than a nominal reference pressure are met simultaneously.

Moreover, the knowledge of at least one real tyre pressure allows the absolute values of the pressures of the other tyres to be estimated, assuming a linear relationship between the pressure of a tyre and the rolling radius of the relative wheel according to the general relationship $P_i = K \ast R_i + P_0$, assuming that in a nominal learning condition all the tyres have the same nominal pressure value $P_n$, and the proportionality parameter K is constant for all tyre types or may be obtained from a table of K values for tyre models.

As a first approximation, it is therefore possible to estimate the absolute values of the pressures of all tyres according to the following relationships $$P_2 = P_1 - \tilde{K}(R_{12} - R_{12_{nominale}})$$
$$P_3 = P_1 - \tilde{K}(R_{13} - R_{14_{nominale}})$$
$$P_4 = P_1 - \tilde{K}(R_{14} - R_{14_{nominale}})$$
$$\tilde{K} = \frac{R_{1_{nominale}}}{K}$$

where $P_1$ is the directly measured actual pressure value of the tyre equipped with the pressure sensor SP (in the example, the tyre associated with the wheel W1), and the indexes $R_{13}$ and $R_{14}$ of relationship between the rolling radius of the wheel W1 and the rolling radius of the wheel W3, respectively W4 may be calculated from the indexes $R_{12}$, $R_{34}$, $R_{rf}$ calculated by the module 14 according to the relationships:

$$R_{13} = \left( \frac{1 + \frac{1}{R_{12}}}{1 + \frac{1}{R_{34}}} \ast R_{rf} \right)^{-1}$$

$$R_{14} = \left( \frac{1 + \frac{1}{R_{12}}}{1 + \frac{1}{R_{34}}} \ast R_{rf} \right)^{-1}$$

It should be noted that the embodiment proposed for the present invention in the foregoing discussion is purely illustrative and non-limiting. A person skilled in the art may easily implement the present invention in different embodiments which however do not depart from the principles outlined herein and are therefore included in the present patent.

This applies in particular to the possibility of applying the method described by exchanging the rear-wheel drive axle with the front-wheel drive axle or in the case of a four-wheel-drive vehicle, and of extending the method described to vehicles having more than two wheels per axle or more than two axles.

Obviously, without prejudice to the principle of the invention, the embodiments and the details of implementation may be greatly modified with respect to those described and illustrated purely by way of non-limiting example, without thereby departing from the scope of protection of the invention as defined in the accompanying claims.

The invention claimed is:

1. A method for determining tyre pressure relationships of a vehicle having a plurality of tyres, each tyre being associated with a respective wheel of a plurality of wheels; the method comprising:
   for each tyre, acquiring by an angular velocity sensor associated with each wheel, and processing unit values of an angular velocity of the wheel with which said tyre is associated;
   selecting by the processing unit a subset of said values of angular velocity, wherein said subset includes values of angular velocity acquired in a rectilinear vehicle travel condition;
   determining by the processing unit a pressure relationship between tyres of each pair of wheels belonging to a same axle of the vehicle by comparing between a rolling radius of the wheel for a first tyre and the rolling radius of the wheel for a second tyre, wherein a ratio between said rolling radius of the wheel of the first tyre and said rolling radius of the second tyre is calculated by the processing unit based on the angular velocity of the wheels with which said first tyre and said second tyre are associated; and
   determining by the processing unit a pressure relationship between pairs of tyres of a pair of axles of the vehicle by comparing between an average value of said rolling radius of the wheel of the first tyre and the second tyre for a first pair of tyres belonging to a first axle of the vehicle and the average value of said rolling radius of the wheel of the first tyre and the second tyre for a second pair of tyres belonging to a second axle of the vehicle, wherein a ratio between the average value of said rolling radius of the wheel of the first tyre and the second tyre for said first pair of tyres belonging to the first axle of the vehicle and the average value of said rolling radius of the wheel of the first tyre and the second tyre for said second pair of tyres belonging to the second axle of the vehicle is calculated by the processing unit based on an average angular velocity of the wheels of the axles of the vehicle with which said pairs of tyres are associated and based on a quantity indicative of slippage of the pair of tyres of driving wheels on the ground,
   wherein said rolling radius of each wheel of said plurality of wheels is calculated by the processing unit from an acquired angular velocity of the wheel;
   wherein, based on the determined pressure relationship between tyres of each pair of wheels belonging to a same axle of the vehicle and on the determined pressure relationship between pairs of tyres of a pair of axles of the vehicle, the processing unit controls displaying an indication to a user of the vehicle of an inflation anomaly of at least one tyre, and wherein based on the indication of an inflation anomaly, the processing unit ensures at least one of applying varying torque or applying varying braking to the driving wheels.

2. The method of claim 1, wherein said quantity indicative of the slippage of the pair of tyres of the driving wheels on the ground is a function of a grip index of the driving wheels on the ground and of a longitudinal acceleration of the vehicle.

3. The method of claim 2, wherein the ratio between an average value of the rolling radius of rear wheels of the vehicle and the average value of the rolling radius of front wheels of the vehicle is calculated according to the relationship $$\frac{\omega_f}{\omega_r} = \frac{R_r}{R_f} + \tilde{k}\left(a_{x_{meas}} + \frac{c}{M}V_x^2 + \frac{F_{roll}}{M}\right)$$

where:
- $\omega_f$ of is the average angular velocity of the front wheels;
- $\omega_r$ or is the average angular velocity of the rear wheels;
- $R_f$ is the average rolling radius of the front wheels;
- $R_r$ is the average rolling radius of the rear wheels;

$$\tilde{k} = \frac{R_r L}{R_f l_f g \mu_1}$$

with L being the wheelbase of the vehicle, $l_f$ the front half-wheelbase of the vehicle, $$\mu_1 = \frac{\partial \mu(\lambda_r)}{\partial \lambda_r}$$

μ being the longitudinal friction coefficient;

$a_{x_{meas}} = a_x + g \sin(\alpha)$ with $a^x$ being the longitudinal acceleration of the vehicle, α the inclination of the vehicle with respect to a horizontal travel plane;
$cV^2_x$ being the aerodynamic force;
M being the mass of the vehicle; and
$F_{roll}$ being the rolling force.

4. The method of claim 1, wherein the ratio between the value of the rolling radius, $R_1$, of the wheel with which the first tyre is associated and the value of the rolling radius, $R_2$, of the wheel with which the second tyre is associated is calculated according to the relationship:

$$\frac{\omega_2}{\omega_1} = \frac{R_1}{R_2}$$

where $\omega_1$ is the angular velocity of the wheel with which the first tyre is associated and $\omega_2$ is the angular velocity of the wheel with which the second tyre is associated, assuming wheel slippage is zero or the same and steering angle of the vehicle is zero.

5. The method of claim 1, comprising a learning step in which a real tyre pressure value and a corresponding nominal value of the rolling radius of wheels with which the tyres are associated are acquired as a function of at least one parameter among: tyre model and tyre wear state.

6. The method of claim 5, wherein a comparison between the value of the rolling radius of the wheel with which the first tyre is associated and the value of the rolling radius of the wheel with which the second tyre is associated is compared with the nominal value of the rolling radius of the wheel with which the first tyre is associated and the nominal value of the rolling radius of the wheel with which the second tyre is associated, and a comparison between the average value of the rolling radius of the wheels belonging to the first axle of the vehicle and the average value of the rolling radius of the wheel belonging to the second axle of the vehicle is compared with a nominal average value of the rolling radius of the wheels belonging to the first axle of the vehicle and a nominal average value of the rolling radius of the wheels belonging to the second axle of the vehicle.

7. The method of claim 6, further comprising determining a deflation condition of a tyre if at an end of said comparison a difference between compared values is greater than a predetermined threshold.

8. The method of claim 6, further comprising determining a deflation condition of a pair of tyres associated with wheels of the same axle if at an end of said comparison the difference between the compared values is greater than a predetermined threshold.

9. The method of claim 8, wherein said predetermined threshold is variable as a function of a grip index of the driving wheels on the ground, of longitudinal velocity of the vehicle or of both.

10. The method of claim 1, wherein said rectilinear vehicle travel condition is determined by acquiring during traveling of the vehicle, signals or data indicative of operation of a vehicle braking system or of a variation of a torque to the driving wheels of the vehicle, or signals or data indicative of the steering angle of the vehicle or rotation angle of a steering wheel.

11. The method of claim 1, further comprising acquiring a pressure measurement of at least one tyre of the vehicle.

12. A processing system for evaluating tyre pressure of a vehicle, the processing system being programmed to carry out the method of claim 1.

13. A non-transitory computer readable medium storing a computer program or program group executable by a processing system, comprising one or more code modules for implementing the method for estimating pressure of the tyres of a vehicle according to claim 1.

* * * * *